(12) United States Patent
Liu

(10) Patent No.: US 6,637,402 B2
(45) Date of Patent: Oct. 28, 2003

(54) PISTON HAVING COMBUSTION CHAMBER DEFINED IN THE CROWN

(75) Inventor: Zhengbai Liu, Lisle, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 180 days.

(21) Appl. No.: 09/922,972

(22) Filed: Aug. 6, 2001

(65) Prior Publication Data
US 2003/0024498 A1 Feb. 6, 2003

(51) Int. Cl.$^7$ .................................................. F02F 3/26
(52) U.S. Cl. ..................... 123/279; 123/193.6; 92/173; 431/321; 431/324
(58) Field of Search ............................... 123/193.6, 263, 123/279, 261, 262, 661–664; 92/173

(56) References Cited

U.S. PATENT DOCUMENTS

| | | |
|---|---|---|
| 4,721,280 A | 1/1988 | Moriyasu et al. |
| 4,883,032 A | 11/1989 | Hunter et al. |
| 5,029,563 A | 7/1991 | Hu |
| 5,285,755 A | 2/1994 | Regueiro |
| 5,657,726 A | 8/1997 | Diggs |
| 5,868,112 A | 2/1999 | Mahakul et al. |
| 5,954,038 A | 9/1999 | Warwick et al. |
| 6,513,476 B1 * | 2/2003 | Liu et al. .................. 123/193.6 |
| 6,536,404 B2 * | 3/2003 | Liu et al. ..................... 123/263 |

* cited by examiner

Primary Examiner—Henry C. Yuen
Assistant Examiner—Johnny H. Hoang
(74) Attorney, Agent, or Firm—Dennis Kelly Sullivan; Susan L. Lukasik; Jeffrey P. Calfa

(57) ABSTRACT

A combustion chamber assembly (and a piston having the combustion chamber assembly) for use in a diesel engine, includes a combustion chamber being defined in a crown of a piston, the combustion chamber having a central axis, and having a center portion being raised above a bottom plane of the combustion chamber. The center portion of the combustion chamber is defined in part by a portion of a sphere, the sphere having a radius, the origin of the radius lying on the combustion chamber central axis. The combustion chamber has a plurality of curved surfaces having smooth tangential transitions between adjacent smooth surfaces, the smooth surfaces including the spherical center portion in combination with a plurality of annular surfaces. A method of forming a combustion chamber is also included.

32 Claims, 2 Drawing Sheets

PISTON HAVING COMBUSTION CHAMBER DEFINED IN THE CROWN

TECHNICAL FIELD

The present invention relates to a piston designed for use in a compression ignition (diesel) internal combustion engine. More particularly, the present invention relates to a piston having a combustion chamber defined in the crown thereof.

BACKGROUND OF THE INVENTION

Many attempts have been made to produce an ideal flow pattern for the charge of air and fuel within the combustion chamber of an internal combustion engine. Considerations that must be taken into effect include, but are not limited to, providing for adequate power generation minimizing the $NO_x$ entrained in the engine exhaust and minimizing the amount of soot particulate also entrained in the engine exhaust.

It is known that changes in any one of a variety of engine design/operating variables, such as engine compression, combustion chamber shape, fuel injection spray pattern, and other variables can have an effect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the $NO_x$ emissions from the engine. Ever increasing regulatory demands mandate reduced levels of $NO_x$. Typically, a combustion chamber design that is effective at reducing $NO_x$ levels has been found to increase the levels of soot and vice-versa. Additionally, doing either of the aforementioned typically reduces engine torque and power outputs.

There are numerous examples of combustion chambers formed in the crown of piston. Notwithstanding all these prior art designs, there remains a need for reduction both in $NO_x$ and entrained soot while at the same time maintaining or enhancing engine torque and power outputs.

SUMMARY OF THE INVENTION

The piston of the present invention substantially meets the aforementioned needs in the industry. The combustion chamber defined in the crown of the piston has been shown to both reduce soot entrainment and $NO_x$ emissions while at the same time slightly increasing engine power output. The piston has been shown to function effectively with heads having two or more valves. A further advantage of the combustion chamber of the present invention is that by being symmetrical with respect to a combustion chamber central axis, the combustion chamber is relatively easily formed in the crown of the piston.

The present invention is a combustion chamber assembly for use in a diesel engine, includes a combustion chamber being defined in a crown of a piston, the combustion chamber having a central axis, and a center portion being raised above a bottom plane of the combustion chamber. The center portion of the combustion chamber is defined in part by a portion of a sphere, the sphere having a radius, the origin of the radius lying on the combustion chamber central axis. The combustion chamber has a plurality of curved surfaces having smooth tangential transitions between adjacent smooth surfaces, the smooth surfaces including the spherical center portion in combination with a plurality of annular surfaces. The present invention is further a piston having the aforementioned combustion chamber assembly and method of forming the aforementioned combustion chamber.

DETAILED DESCRIPTION OF THE DRAWINGS

Figure 1:
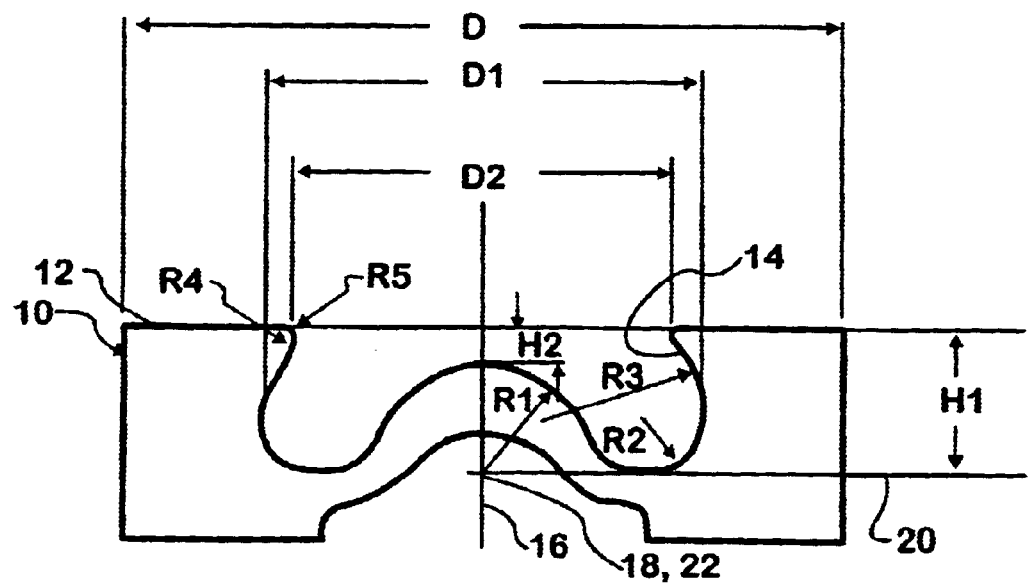
FIG. 1 is a sectional view of the piston of the present invention.

The piston of the present invention is shown generally at 10 in FIG. 1. The crown 12 of the piston 10 defines in part the upper margin of the piston 10. The combustion chamber 14 of the present invention is defined in the crown 12. It should be noted that the combustion chamber 14 is symmetrical about the longitudinal axis 16 that is coincident with the center of the combustion chamber 14. The various radii (R), diameters (D), and heights (H) that will be described below are clearly indicated in the depiction of FIG. 1.

The piston 10 of the present invention is designed primarily for use in heavy duty diesel engines but would also be applicable to lighter duty diesel engines. The piston 10 may be utilized with two-valve or multiple-valve heads. It is desirable that the fuel be injected proximate the center of the combustion chamber and that the injection pattern be radially symmetrical. In a preferred embodiment, the injector injects a spray of fuel that has six subsprays that are equi-angularly displaced relative to the axis 16.

The combustion chamber 14 defined in the crown 12 of the piston 10 is comprised of curved surfaces, being both spherical and annular surfaces. The combustion chamber 14 has no flat surfaces. There is a smooth, tangential transition between the various curved surfaces that define the combustion chamber 14, as described in greater detail below.

There are a number of parameters that control the geometry of the combustion chamber 14 and thereby control the diesel engine combustion performance as well as $NO_x$ and soot emissions. A portion of a spherical surface, defined by the radius R1, is located in the central space of the combustion chamber 14. The origin 18 of the spherical surface is located on the center axis 16 of the combustion chamber 14. The distance between the origin 18 of the spherical surface and the point of intersection of the axis 16 with the bottom plane 20 of the combustion chamber 14 should be equal to or greater than zero and should be less than 0.2 D. As depicted in FIG. 1, the origin 18 is at the point of intersection 22 of the axis 16 of the combustion chamber 14 and the bottom plane 20 of the combustion chamber 14. In other words, the origin 18 and the point of intersection 22 are depicted as being coincident. This is the preferred disposition of the origin 18 at the point of intersection 22 of the axis 16 of the combustion chamber 14 and the bottom plane 20 of the combustion chamber, but there could as well be a vertical distance between the origin 18 and the point of intersection 22.

The following ratios define certain parameters of the combustion chamber 14.

The ratio of D1 to D should be greater than 0.49 and should be less than 0.81 and is preferably 0.605.

The ratio of D2 to D1 should be greater than 0.81 and should be less than 0.99 and is preferably 0.908.

The ratio of H1 to D1 should be greater than 0.17 and should be less than 0.47 and is preferably 0.344.

The ratio of H2 to H1 should be greater than 0.05 and should be less than 0.45 and is preferably 0.253.

The ratio of R1 to D1 should be greater than 0.13 and should be less than 0.43 and is preferably 0.257.

The ratio of R2 to D1 should be greater than 0.09 and should be less than 0.25 and is preferably 0.133.

The ratio of R3 to D1 should be greater than 0.17 and should be less than 0.55 and is preferably 0.36.

The ratio of R4 to D1 should be greater than 0.08 and should be less than 0.33 and is preferably 0.142.

The ratio of R5 to D1 should be greater than 0.01 and should be less than 0.02 and is preferably 0.14.

The combustion chamber 14 as indicated above is comprised of combined spherical and annular surfaces. The spherical surface is defined by the radius R1. The annular surfaces are defined by the radiuses R2–R5. It is noted that the transition between R1 and R2 is smooth and tangential, the transition between R2 and R3 is smooth and tangential, the transition between R3 and R4 is smooth and tangential, and the transition between R4 and R5 is smooth and tangential. In this manner, there are no flat surfaces that define the combustion chamber 14. The curves and smooth transitions as previously described promote smooth flow in the combustion chamber 14 and reduce the thermal loading in the combustion chamber 14. Further, the combustion chamber 14 is symmetrical about the axis 16. Accordingly, it is much easier to turn the combustion chamber 14 as compared to a symmetrical combustion chamber defined in a piston.

It should further be noted that the radii R3–R5 define a reentrant combustion chamber 14 as distinct from an open combustion chamber as depicted in the prior art.

Figure 2:
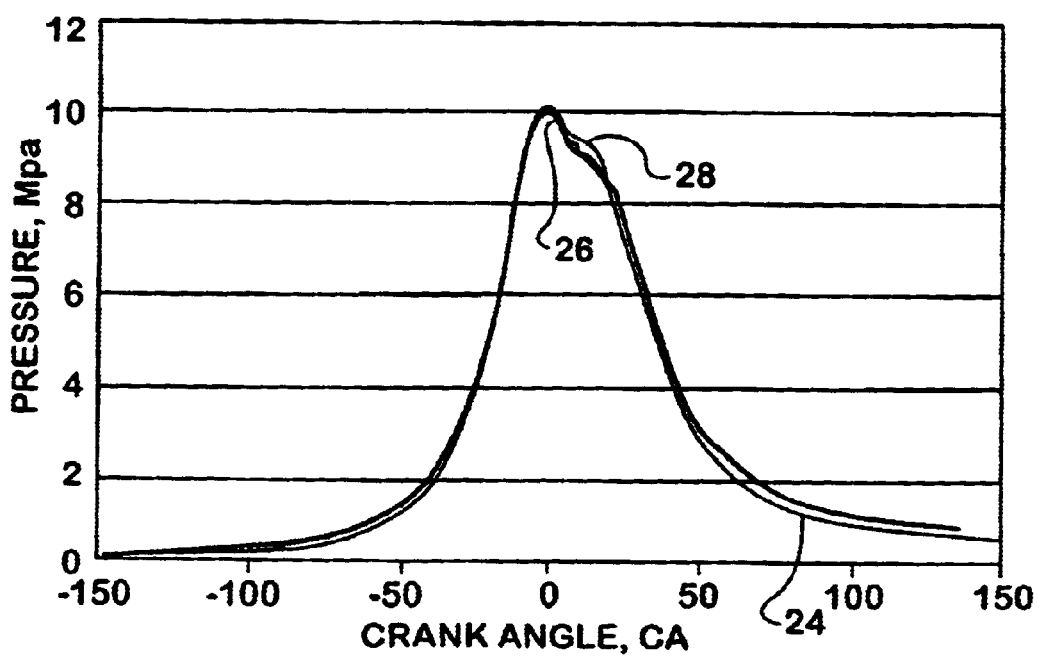
FIG. 2 is a graphic representation of power of an existing piston and combustion chamber as compared to the piston and combustion chamber of the present invention.
Figure 3:
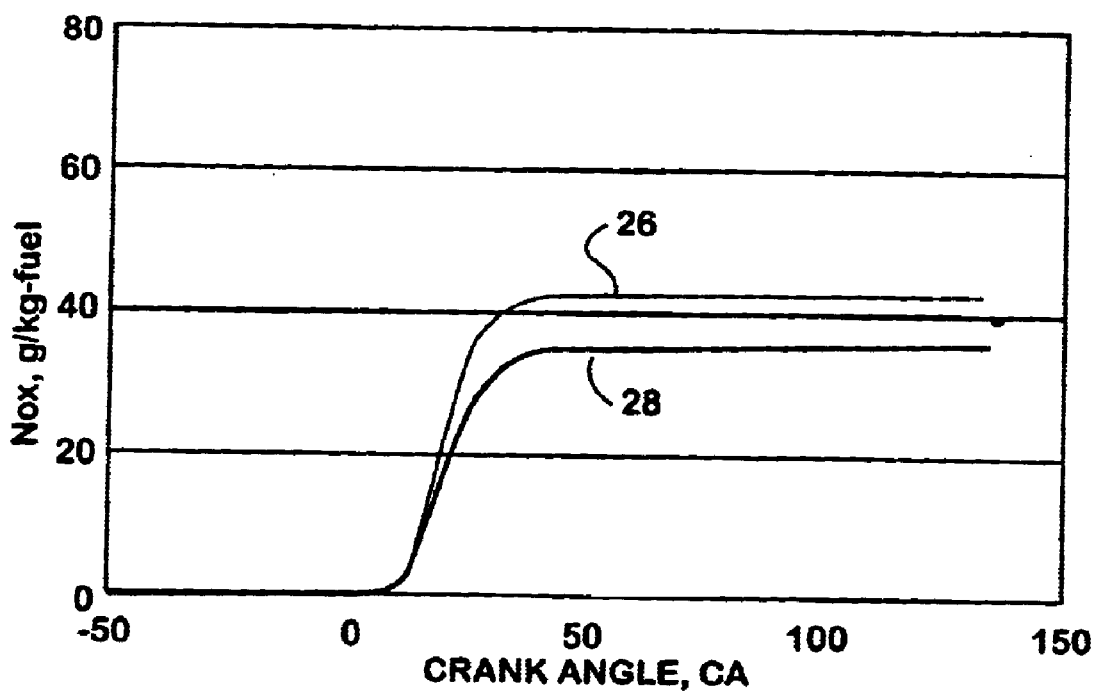
FIG. 3 is a graphic representation of an $NO_x$ generated by an existing piston and combustion chamber and the piston and combustion chamber of the present invention.
Figure 4:
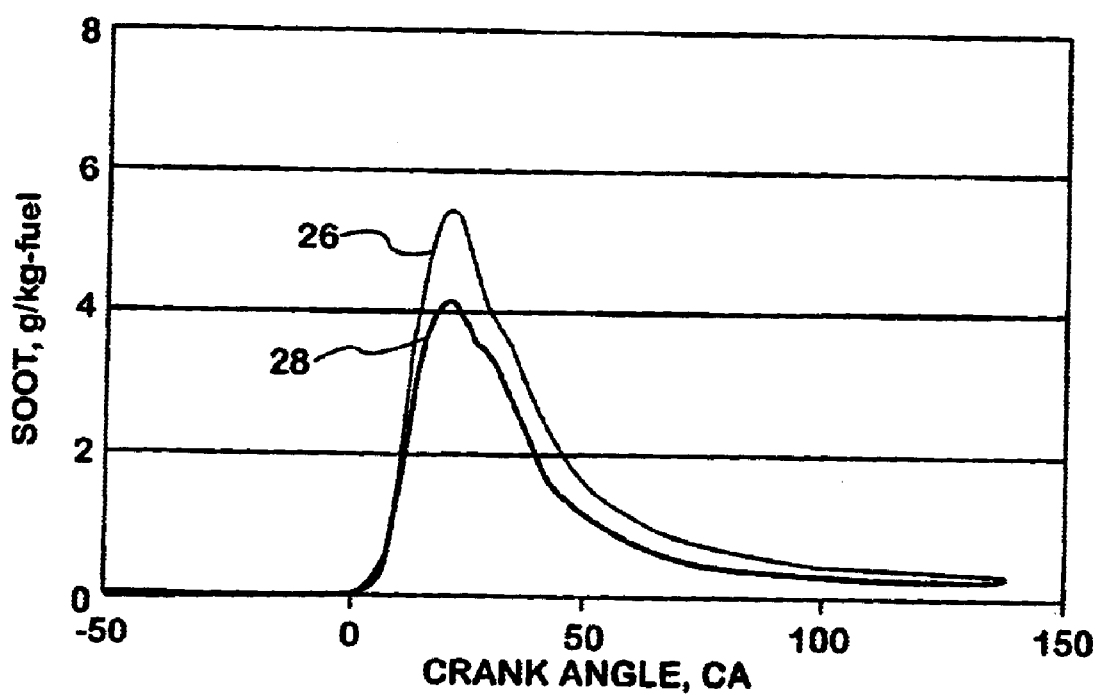
FIG. 4 is a graphic representation of the soot generated by an existing piston and combustion as compared to the piston and combustion chamber of the present invention.

Combustion performance improvement and pollutant emission reduction are depicted in FIGS. 2–4. Referring to FIG. 2, power output is the area beneath each of the curves. A first actual experiment of a known combustion chamber is depicted at curve 24. Close to the peak of the curve 24, a trace of a simulation of the known combustion chamber that resulted in the curve 26 closely overlies the curve 24. The trace 26, by closely overlying the curve 24, substantiates the validity of the simulation. This same simulation was then used to simulate the performance of the combustion chamber 14. The simulation of the combustion chamber 14 is depicted by curve 28. It is noted that the area underneath the curve 28 is slightly greater than the area underneath the curve 26, indicating that the power output resulting from the combustion chamber 14 is slightly greater than the power output of the known combustion chamber.

FIG. 3 depicts the simulated $NO_x$ generation of a known combustion chamber as depicted by line 26 and the simulated results of $NO_x$ generation of the combustion chamber 14 of the present invention as depicted in line 28. It is noted that the $NO_x$ generation by the combustion chamber 14 of the present invention is significantly less than the $NO_x$ of the known combustion chamber as depicted by line 26.

FIG. 4 depicts the simulated soot generation of a known combustion chamber as depicted by line 26 in comparison with the simulated soot generation of the combustion chamber 14 of the present invention as depicted by line 28. It should be noted that soot generation of the combustion chamber 14 is significantly less than the soot generation of the known combustion chamber. It is significant to note in reference to FIGS. 2–4 that the combustion chamber 14 results in increased power output and at the same time decreases both the $NO_x$ generation and soot generation as compared to a known combustion chamber.

What is claimed is:

1. A combustion chamber assembly for use in a diesel engine, comprising:
   a combustion chamber being defined in a crown of a piston, the combustion chamber having a central axis, and a center portion being elevated relative to a bottom plane of the combustion chamber;
   the center portion being defined in part by a portion of a sphere, the sphere having a radius, the origin of the radius lying on the combustion chamber central axis; and
   the combustion chamber having a plurality of curved surfaces having smooth tangential transitions between adjacent smooth surfaces, the smooth surfaces including the spherical center portion in combination with a plurality of annular surfaces.

2. The combustion chamber assembly of claim 1 wherein the origin of the spherical surface lies in the bottom plane or lies below or above the bottom plane.

3. The combustion chamber assembly of claim 2 wherein the origin of the spherical surface lies coincident with a point of intersection of the bottom plane with the combustion chamber central axis.

4. The combustion chamber assembly of claim 1 wherein at least a portion of the plurality of annular surfaces define a reentrant interface with the crown of the piston.

5. The combustion chamber assembly of claim 1 wherein the ratio of the diameter of the combustion chamber at the point of intersection with the crown of the piston to the maximum diameter of the combustion chamber is greater than 0.81 and less than 0.99.

6. The combustion chamber assembly of claim 5 wherein the ratio of the diameter of the combustion chamber at the point of intersection with the crown of the piston to the maximum diameter of the combustion chamber is substantially 0.9.

7. The combustion chamber assembly of claim 1 wherein the plurality of annular surfaces is defined by at least five radii.

8. The combustion chamber assembly of claim 1 wherein the ratio of the radius of the spherical surface to the maximum diameter of the combustion chamber is greater than 0.13 and less than 0.43.

9. The combustion chamber assembly of claim 8 wherein the ratio of the radius of the spherical surface to the maximum diameter of the combustion chamber is substantially 0.25.

10. The combustion chamber assembly of claim 1 being free of flat surfaces.

11. A piston for use in a diesel engine, comprising:
    a combustion chamber being defined in a crown of the piston, the piston having a central axis, the combustion chamber having a center portion being elevated relative to a bottom plane of the combustion chamber, the center portion being defined in part by a portion of a sphere, the sphere having a radius, the origin of the radius lying on the combustion chamber central axis, the combustion chamber having a plurality of curved surfaces having smooth tangential transitions between adjacent smooth surfaces, the smooth surfaces including the spherical center portion in combination with a plurality of annular surfaces.

12. The piston of claim 11 wherein the origin of the spherical surface lies in the bottom plane or lies below or above the bottom plane.

13. The piston of claim 12 wherein the origin of the spherical surface lies coincident with a point of intersection of the bottom plane with the combustion chamber central axis.

14. The piston of claim 11 wherein at least a portion of the plurality of annular surfaces cooperate to define a reentrant interface with the crown of the piston.

15. The piston of claim 11 wherein the ratio of the diameter of the combustion chamber at the point of intersection with the crown of the piston to the maximum diameter of the combustion chamber is greater than 0.81 and less than 0.99.

16. The piston of claim 15 wherein the ratio of the diameter of the combustion chamber at the point of intersection with the crown of the piston to the maximum diameter of the combustion chamber is substantially 0.9.

17. The piston of claim 11 wherein the plurality of annular surfaces is defined by at least five radii.

18. The piston of claim 11 wherein the ratio of the radius of the spherical surface to the maximum diameter of the combustion chamber is greater than 0.13 and less than 0.43.

19. The piston of claim 18 wherein the ratio of the radius of the spherical surface to the maximum diameter of the combustion chamber is substantially 0.25.

20. The piston of claim 11, the combustion chamber being free of flat surfaces.

21. A combustion chamber assembly for use in a diesel engine, comprising:
    a combustion chamber being defined in a crown of a piston, the combustion chamber having a central axis, and having a center portion being elevated relative to a bottom plane of the combustion chamber;
    the center portion being defined in part by a portion of a sphere, the sphere having a radius, the origin of the spherical surface lies coincident with a point of intersection of the bottom plane with the combustion chamber central axis;
    the combustion chamber having a plurality of curved surfaces having smooth tangential transitions between adjacent smooth surfaces, the smooth surfaces including the spherical center portion in combination with a plurality of annular surfaces; and
    at least a portion of the plurality of annular surfaces defining a reentrant interface with the crown of the piston.

22. The combustion chamber assembly of claim 21 wherein the ratio of the diameter of the combustion chamber at the point of intersection with the crown of the piston to the maximum diameter of the combustion chamber is greater than 0.81 and less than 0.99.

23. The combustion chamber assembly of claim 22 wherein the ratio of the diameter of the combustion chamber at the point of intersection with the crown of the piston to the maximum diameter of the combustion chamber is substantially 0.9.

24. The combustion chamber assembly of claim 21 wherein the plurality of annular surfaces is defined by at least five radii.

25. The combustion chamber assembly of claim 21 wherein the ratio of the radius of the spherical surface to the maximum diameter of the combustion chamber is greater than 0.13 and less than 0.43.

26. The combustion chamber assembly of claim 25 wherein the ratio of the radius of the spherical surface to the maximum diameter of the combustion chamber is substantially 0.25.

27. The combustion chamber assembly of claim 21 being free of flat surfaces.

28. A method of farming a combustion chamber for use in a diesel engine, comprising:
    defining a combustion chamber in a crown of a piston, the combustion chamber having a central axis;
    defining a combustion chamber center portion being raised above a bottom plane of the combustion chamber;
    defining the center portion in part by a portion of a sphere, the sphere having a radius,
    locating the origin of the radius lying on the combustion chamber central axis; and
    defining a plurality of combustion chamber curved surfaces having smooth tangential transitions between adjacent smooth surfaces, the smooth surfaces including the spherical center portion in combination with the plurality of annular surfaces.

29. The method of claim 28 including locating the origin of the spherical surface in the bottom plane or below or above the bottom plane.

30. The method of claim 29 including locating the origin of the spherical surface coincident with a point of intersection of the bottom plane with the combustion chamber central axis.

31. The method of claim 28 including defining a reentrant interface with the crown of the piston.

32. The method of claim 28 including defining the combustion chamber free of flat surfaces.

* * * * *